(12) United States Patent
Minami

(10) Patent No.: US 11,182,039 B2
(45) Date of Patent: Nov. 23, 2021

(54) TOUCH PANEL

(71) Applicant: Panasonic Intellectual Property Management Co., Ltd., Osaka (JP)

(72) Inventor: Seiichi Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/797,465

(22) Filed: Feb. 21, 2020

(65) Prior Publication Data

US 2020/0192508 A1 Jun. 18, 2020

Related U.S. Application Data

(63) Continuation of application No. PCT/JP2018/031680, filed on Aug. 28, 2018.

(30) Foreign Application Priority Data

Sep. 1, 2017 (JP) .............................. JP2017-168603

(51) Int. Cl.
*G06F 3/047* (2006.01)
*G06F 3/045* (2006.01)
*G06F 3/041* (2006.01)

(52) U.S. Cl.
CPC .............. *G06F 3/047* (2013.01); *G06F 3/045* (2013.01); *G06F 3/041* (2013.01); *G06F 2203/04103* (2013.01)

(58) Field of Classification Search
CPC .......... G06F 3/045; G06F 3/047; G06F 3/041; G06F 2203/04103

(Continued)

(56) References Cited

U.S. PATENT DOCUMENTS

| | | | |
|---|---|---|---|
| 6,225,577 B1 | 5/2001 | Sawai et al. | |
| 2009/0266624 A1* | 10/2009 | Kondoh | ................... G06F 3/045 178/18.05 |
| 2016/0188042 A1* | 6/2016 | Tomita | ................... G06F 3/045 345/174 |

FOREIGN PATENT DOCUMENTS

| | | | |
|---|---|---|---|
| JP | H10-214145 A | 8/1998 | |
| JP | 2005-004388 A | 1/2005 | |

(Continued)

OTHER PUBLICATIONS

Machined English translation for JP 2005004388 A, Sep. 10, 2020, pp. 1-8 (Year: 2020).*

(Continued)

*Primary Examiner* — Jimmy H Nguyen
(74) *Attorney, Agent, or Firm* — McDermott Will & Emery LLP

(57) ABSTRACT

The touch panel includes an upper wiring board and a lower wiring board. The upper wiring board includes an upper conductive layer formed on an upper substrate, and an upper electrode wire electrically connected to the upper conductive layer. The lower wiring board includes a lower conductive layer formed on a lower substrate, a lower electrode wire electrically connected to the lower conductive layer, and a lead wire electrically connected to the lower conductive layer. The lead wire is thinner than the upper electrode wire and overlaps the upper electrode wire in plan view. A center line of a range in which the upper electrode wire and the lead wire overlap each other is shifted with respect to a center line of the upper electrode wire.

6 Claims, 8 Drawing Sheets

(58) Field of Classification Search
USPC .................................................. 345/173, 174
See application file for complete search history.

(56) References Cited

FOREIGN PATENT DOCUMENTS

JP    2013-097415 A    5/2013
KR    10-2010-0110463 A    10/2010

OTHER PUBLICATIONS

Machined English translation for KR 1020100110463 A, Sep. 10, 2020, pp. 1-18 (Year: 2020).*
International Search Report issued in corresponding International Patent Application No. PCT/JP2018/031680, dated Oct. 2, 2018, with English translation.

* cited by examiner

TOUCH PANEL

CROSS-REFERENCE TO RELATED APPLICATIONS

This is a continuation of International Application No. PCT/JP2018/031680 filed on Aug. 28, 2018, which claims priority to Japanese Patent Application No. 2017-168603 filed on Sep. 1, 2017. The entire disclosures of these applications are incorporated by reference herein.

BACKGROUND

The present disclosure relates to a touch panel mainly used for operating various electronic apparatuses.

The various electronic apparatuses, in each of which a transparent touch panel is mounted, as an input operation part, on an upper surface of a display part such as a liquid crystal display, are increasing. An operator can operate an electronic apparatus by visually recognizing display contents of the display part via the touch panel and touching the touch panel with, e.g., a finger.

Japanese Unexamined Patent Publication No. 2013-97415 discloses an example of a configuration of a resistive film type touch panel. The touch panel disclosed in Japanese Unexamined Patent Publication No. 2013-97415 includes an upper wiring board and a lower wiring board which face each other in such a way as to be spaced apart from each other. The upper wiring board includes an upper conductive layer provided on a lower surface of an upper substrate and an upper electrode portion disposed for applying a voltage to the upper conductive layer. The lower wiring substrate includes a lower conductive layer provided on an upper surface of a lower substrate and a lower electrode portion disposed for applying a voltage to the lower conductive layer.

SUMMARY

As a result of studies by the present inventors, it has been found that the conventional touch panel has the following problems. Specifically, the conventional touch panel, when a DC voltage is applied between the upper electrode portion and the lower electrode portion for a long time under a high-temperature and high-humidity atmosphere, causes a phenomenon in which a voltage applied to an operation area decreases and an accuracy of detecting a pressing position decreases.

The present disclosure attempts to provide a touch panel in which an accuracy of detecting a pressing position does not decrease even when the touch panel is used for a long time under the high-temperature and high-humidity atmosphere.

A touch panel according to one embodiment of the present disclosure includes: an upper wiring board having an upper substrate, an upper conductive layer formed on the upper substrate, and an upper electrode wire electrically connected to the upper conductive layer; and a lower wiring board having a lower substrate, a lower conductive layer formed on a surface of the lower substrate, the surface being closer to the upper wiring board, and a lower electrode wire electrically connected to the lower conductive layer, and a lead wire electrically connected to the lower conductive layer, the lead wire is thinner than the upper electrode wire and overlaps the upper electrode wire in plan view, and a center line of an overlapping range in which the upper electrode wire and the lead wire overlap each other is shifted with respect to a center line of the upper electrode wire.

According to this aspect, the lead wire is thinner than the upper electrode wire and overlaps the upper electrode wire in plan view. Then, the center line of the overlapping range in which the upper electrode wire and the lead wire overlap each other is shifted with respect to the center line of the upper electrode wire. Thus, when a DC voltage is applied between the upper electrode wire and the lower electrode wire as well as the lead wire, an intensity of an electric field generated between the upper electrode wire and the lead wire can be partially made small. Therefore, even when the DC voltage is applied between the upper electrode wire and the lower electrode wire as well as the lead wire for a long time, a value of connection resistance between the upper conductive layer and the upper electrode wire can be regulated, thereby suppressing deterioration of accuracy of detecting a pressing position on the touch panel.

According to the present disclosure, even when the touch panel is used for a long time in a high-temperature and high-humidity atmosphere, deterioration of accuracy of detecting the pressing position on the touch panel can be suppressed.

The touch panel according to the present disclosure has an advantage that detection performance does not deteriorate even when used for a long time in the high-temperature and high-humidity atmosphere and is useful mainly for operating various electronic devices.

BRIEF DESCRIPTION OF THE DRAWINGS

FIG. 6A shows a start voltage and FIG. 6B shows an effective potential ratio.

DETAILED DESCRIPTION

Embodiments of the present disclosure are described below with reference to the drawings. The following description of advantageous embodiments is merely illustrative in nature and is not intended to limit the scope, applications or use of the present disclosure.

Note that in the following drawings, a longitudinal direction of an operation area of a touch panel is defined as an X direction (corresponding to a first direction), a short direction of the operation area is defined as a Y direction (corresponding to a second direction), and a direction in which the operation area is viewed in plan view is defined as a Z direction. In addition, in the present disclosure, a side where an operation surface is located is referred to an upper side, and a side opposite to the operation surface is referred to as a lower side. For example, a wiring board disposed adjacent to the operation surface of the touch panel is referred to as an upper wiring board, and a wiring board disposed at the position away from the operation surface is referred to as a lower wiring board.

First Embodiment

Figure 1:
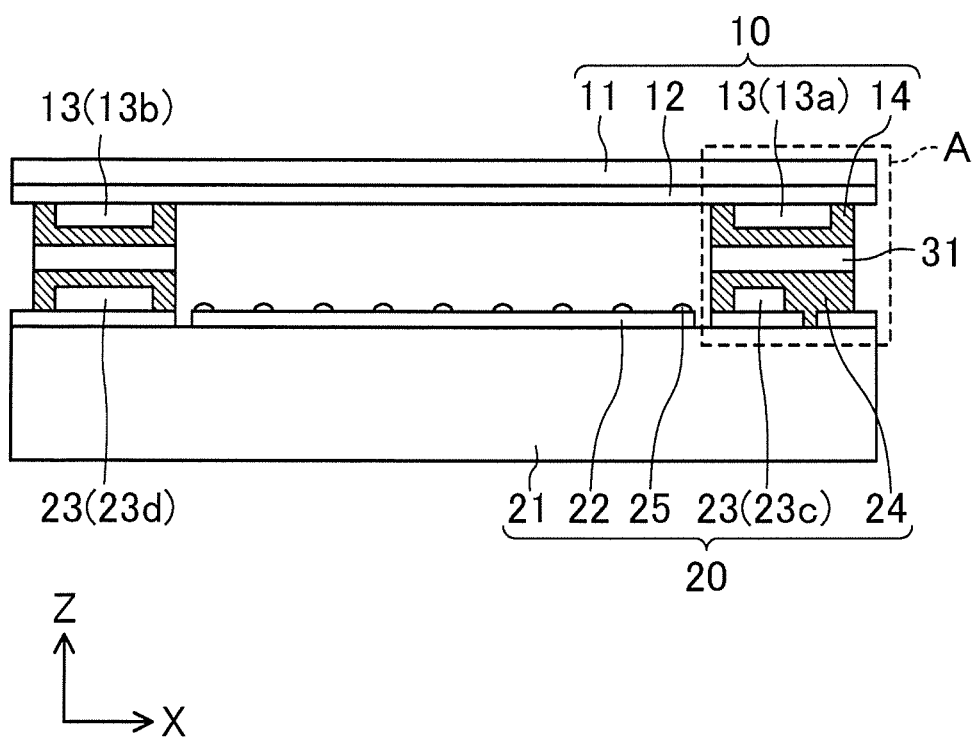
FIG. 1 is a cross-sectional view of a touch panel according to a first embodiment.
Figure 2:
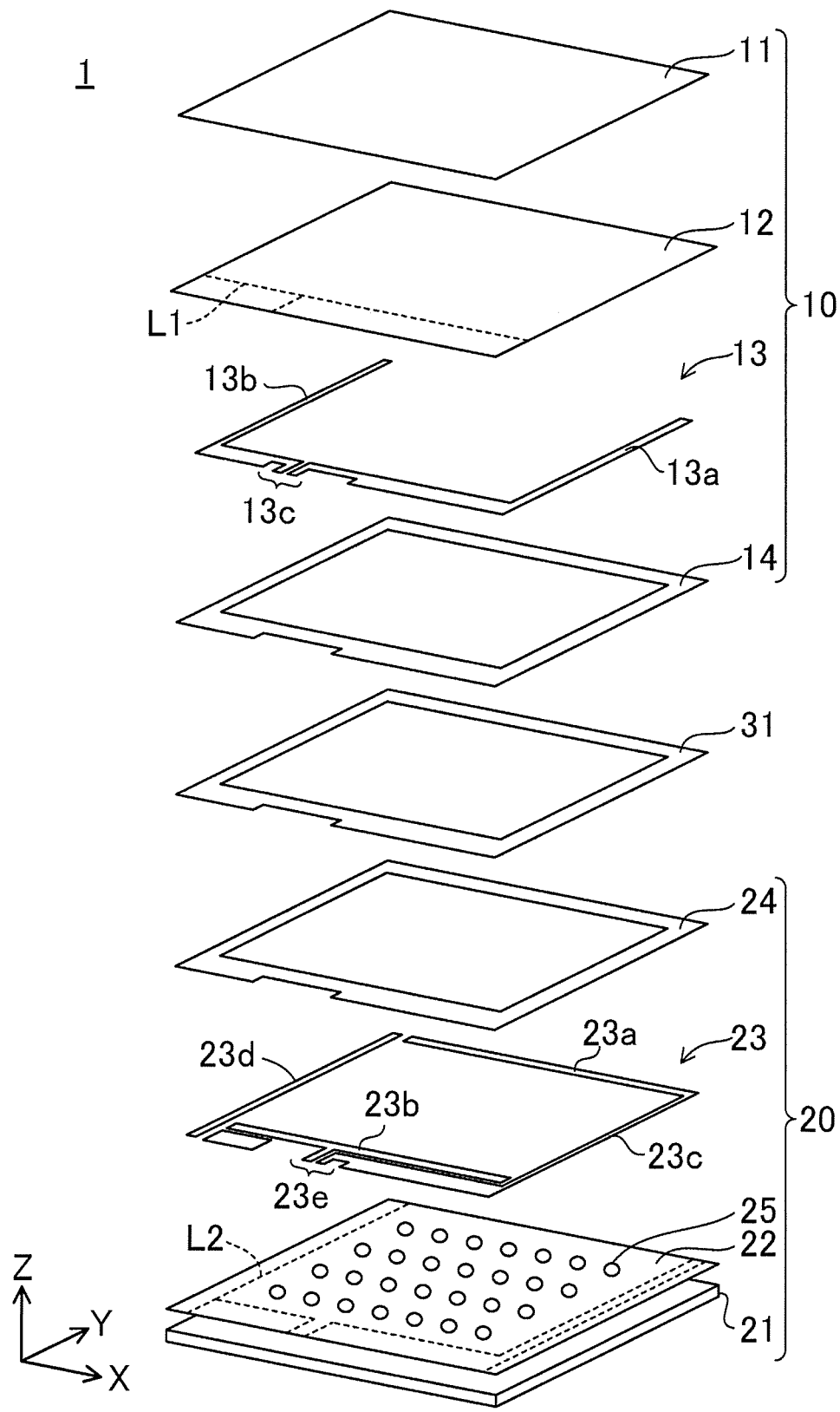
FIG. 2 is an exploded perspective view of the touch panel according to the first embodiment.

FIG. 1 is a sectional view of a touch panel according to a first embodiment, and FIG. 2 is an exploded perspective view of the touch panel according to the first embodiment. As shown in FIGS. 1 and 2, the touch panel 1 includes an upper wiring board 10 and a lower wiring board 20 which face each other in such a way as to be spaced apart from each other. Outer peripheries of the upper wiring board 10 and the lower wiring board 20 are bonded to each other by an adhesive layer 31 comprised of, e.g., an acrylic adhesive.

Figure 3:
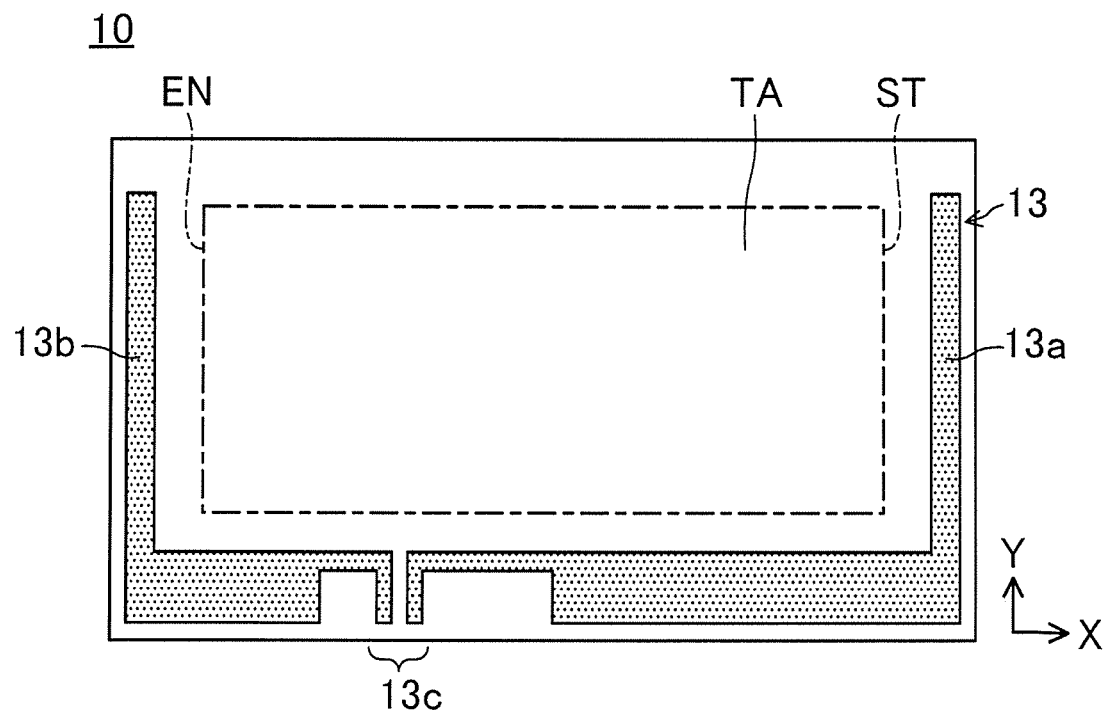
FIG. 3 shows a wiring pattern of an upper wiring board.
Figure 4:
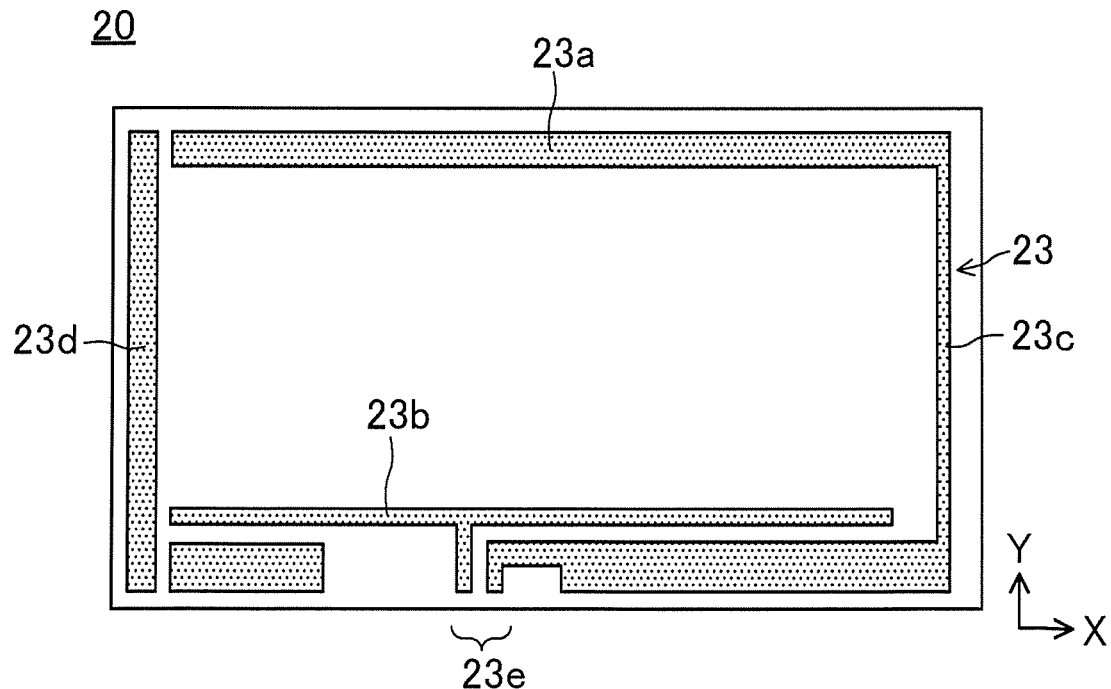
FIG. 4 shows a wiring pattern of a lower wiring board.

FIG. 3 is a plan view showing a wiring pattern of an upper electrode portion 13 in the upper wiring board 10, and FIG. 4 is a plan view showing a wiring pattern of a lower electrode portion 23 in the lower wiring board 20. In FIG. 3, an area TA enclosed by an alternate long and short dash line is an operation area of the touch panel 1. An operator presses a surface of the upper wiring board 10, thereby operating various electronic apparatuses.

The upper wiring board 10 includes an upper substrate 11, an upper conductive layer 12, an upper electrode portion 13, and an insulating layer 14. The upper substrate 11 is formed, in a substantially rectangular shape, of a resin film having high light transmittivity such as polyethylene terephthalate resin. The upper conductive layer 12 is formed on a surface of the upper substrate 11, the surface being closer to the lower wiring board 20, and the upper conductive layer 12 is a conductive film having high light transmittivity such as indium tin oxide is formed by, e.g., a sputtering method. The upper electrode portion 13 is provided around the operation area TA under the surface of the upper substrate 11, the surface being closer to the lower wiring board 20 and is used to apply a voltage to the upper conductive layer 12 within the operation area TA. The upper electrode portion 13 is comprised of a material obtained by making resin such as polyester resin contain silver. The insulating layer 14 is disposed so as to cover a surface of the upper electrode portion 13. The insulating layer 14 is comprised of an insulating material such as acrylic resin.

The lower wiring board 20 includes a lower substrate 21, a lower conductive layer 22, a lower electrode portion 23, an insulating layer 14, and dot spacers 25. The lower substrate 21 is comprised of glass, which is different from the upper substrate 11. The lower conductive layer 22 is formed on a surface of the lower substrate 21, the surface being closer to the position closer to the upper wiring board 10, and the lower conductive layer 22 is a conductive film having high light transmittivity such as indium tin oxide is formed by, e.g., a sputtering method just like the upper conductive layer 12. The lower electrode portion 23 is provided around the operation area TA above the surface of the lower substrate 21, the surface being closer to the upper wiring board 10 and is used to apply a voltage to the lower conductive layer 22 within the operation area TA. Just like the upper electrode portion 13, the lower electrode portion 23 is comprised of a material obtained by making resin such as polyester resin contain silver. The insulating layer 24 is disposed so as to cover a surface of the lower electrode portion 23. Just like the insulating layer 14, the insulating layer 24 is comprised of an insulating material such as acrylic resin. In addition, the dot spacers 25 each having a semispherical shape are comprised of insulating resin such as epoxy resin and silicone resin and are disposed on an upper surface of the lower conductive layer 22 at predetermined intervals.

In addition, in FIGS. 2, L1 and L2 are grooves formed by, for example, laser etching on the upper conductive layer 12 and the lower conductive layer 22, respectively. The formation of the grooves L1 and L2 allows the upper conductive layer 12 and the lower conductive layer 22 within the operation area TA to be electrically disconnected from the surrounding conductive layers.

As shown in FIG. 3, the upper electrode portion 13 includes a first electrode wire 13a and a second electrode wire 13b which extend in a Y direction at a position of both sides of the operation area TA in an X direction. The first and second electrode wires 13a and 13b are parallel electrodes for applying a voltage in the X direction to the upper conductive layer 12 within the operation area TA. A reference numeral 13c denotes a terminal electrode, and a predetermined voltage is applied to the first and second electrode wires 13a and 13b from the terminal electrode 13c. Note that a voltage at an end portion ST on a low potential side in the X direction of the operation area TA is referred to as a start voltage, and a voltage at an end portion EN on a high potential side in the X direction of the operation area TA is referred to as an end voltage.

In addition, as shown in FIG. 4, the lower electrode portion 23 includes a third electrode wire 23a and a fourth electrode wire 23b which extend in the X direction at a position of both sides of the operation area TA in the Y direction. The third and fourth electrode wires 23a and 23b are parallel electrodes for applying a voltage in the Y direction to the lower conductive layer 22 within the operation area TA. Furthermore, the lower electrode portion 23 includes a lead wire 23c which extends in the Y direction on the right of the operation area TA in the drawing and a dummy wire 23d which extends in the Y direction on the left of the operation area TA in the drawing. The lead wire 23c is connected to the third electrode wire 23a. A reference numeral 23e denotes a terminal electrode, and a predetermined voltage is applied to the third and fourth electrode wires 23a and 23b from the terminal electrode 23e. The dummy wire 23d is not connected to the terminal electrode 23e, and a voltage is not applied thereto.

The operation principle of the touch panel 1 is as follows. First, at the time of non-operation, in the upper electrode portion 13, a predetermined positive potential, for example, +5 V is applied from the terminal electrode 13c to the first and second electrode wires 13a and 13b. On the other hand, in the lower electrode portion 23, 0 V is applied to the third and fourth electrode wires 23a and 23b from the terminal electrode 23e. When an operator presses a portion within the operation area TA from the side of the upper wiring board 10 with, e.g., a finger or a pen, the upper substrate 11 warps, and the upper conductive layer 12 is brought into contact with the lower conductive layer 22. In other words, it can be detected that the upper electrode portion 13 and the lower electrode portion 23 are short-circuited and operated.

When the operation is detected, in the upper electrode portion 13, 0 V is applied to the first electrode wire 13a and +5 V is applied to the second electrode wire 13b from the terminal electrode 13c. Then, a potential is detected by the lower electrode portion 23, and an operation position in the X direction is detected. In addition, in the lower electrode portion 23, 0 V is applied to the third electrode wire 23a and +5 V is applied to the fourth electrode wire 23b from the terminal electrode 23e. Then, a potential is detected by the upper electrode portion 13, and an operation position in the Y direction is detected.

Figure 5:
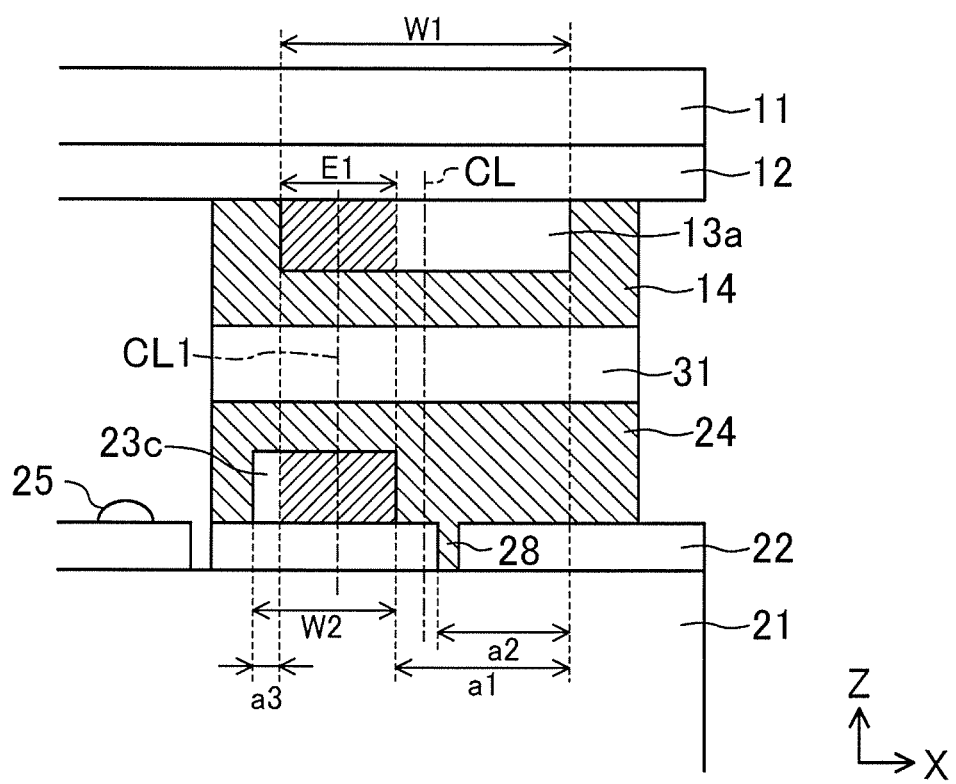
FIG. 5 is an enlarged view of a portion shown in FIG. 1.

FIG. 5 is an enlarged view of a portion A in the cross-sectional view of FIG. 1. As shown in FIG. 5, the lead wire 23c of the lower electrode portion 23 is narrower (W2<W1) than the first electrode wire 13a of the upper electrode portion 13. Furthermore, the lead wire 23c overlaps the first electrode wire 13a in plan view (as viewed in the Z direction). In the X direction, a position of a center line CL1 of an overlapping range E1 in which the lead wire 23c overlaps the first electrode wire 13a is shifted with respect to a position of a center line CL of the first electrode wire 13a. In a configuration shown in FIG. 5, the center line CL1 of the overlapping range E1 is shifted toward the left in the drawing (a side of the operation area TA) with respect to the center line CL of the first electrode wire 13a. In other words, a position of the lead wire 23c is shifted toward the operation area TA with respect to the first electrode wire 13a in the X direction. Furthermore, in the configuration shown in FIG. 5, in the X direction, an end portion, of the lead wire 23c, near the operation area TA is located closer to the operation area TA than an end portion, of the first electrode wire 13a, near the operation area TA is. As described above, by employing the configuration in which positions of the end portions, of the lead wire 23c and the first electrode wire 13a, near the operation area TA are shifted from each other, the overlapping range E1 can be made small without changing the width of the lead wire 23c.

In addition, in the configuration shown in FIG. 5, in the lower conductive layer 22 below the lead wire 23c, a groove 28 is formed by laser etching on the right of the lead wire 23c in the drawing (on a position away from the operating area TA). An area of the lower conductive layer 22 below the lead wire 23c is electrically disconnected from an area of the lower conductive layer 22 thereoutside by this groove 28. A position of the groove 28 overlaps a position of the first electrode wire 13a in plan view. Therefore, an area of the lower conductive layer 22 electrically connected to the lead wire 23c is limited by the groove 28 and only partially overlaps the first electrode wire 13a.

By employing the above-described configuration, when a voltage is applied between the upper electrode portion 13 and the lower electrode portion 23, an intensity of an electric field generated between the first electrode wire 13a and the lead wire 23c can be partially made small. For example, in the configuration shown in FIG. 5, since a distance from a portion of the first electrode wire 13a on the right of the drawing to the lead wire 23c is long, the intensity of the electric field to be generated becomes small. Accordingly, even when a DC voltage is applied between the upper electrode portion 13 and the lower electrode portion 23 for a long time, a value of connection resistance between the upper conductive layer 12 and the first electrode wire 13a can be regulated. This can suppress deterioration of accuracy of detecting the pressing position on the touch panel.

Moreover, since the area of the lower conductive layer 22 electrically connected to the lead wire 23c is limited by the formation of the groove 28, the intensity of the electric field generated between the first electrode wire 13a and the lead wire 23c can be made further small.

<Results of Experiment>

As a result of studies by the present inventors, it has been found that in the conventional configuration, when a DC voltage is applied between the upper electrode portion and the lower electrode portion for a long period of time under a high-temperature and high-humidity environment, the electric characteristics are deteriorated. It has been found that the configuration of the present invention can suppress such deterioration of the electric characteristics. Hereinafter, results of an experiment will be described.

In a configuration of Example,

W1 (a wire width of the first electrode wire 13a) was 1.2 mm.

W2 (a wire width of the lead wire 23c) was 0.6 mm.

Then, as shown in FIG. 5, in the X direction, the center line CL1 of the overlapping range E1 in which the lead wire 23c overlapped the first electrode wire 13a was shifted with respect to the center line CL of the first electrode wire 13a. Specifically, in FIG. 5, respective widths were set as follows.

a1: 0.7 mm
a2: 0.4 mm
a3: 0.1 mm

In contrast, in a configuration of Comparative Example,

W1 (a wire width of the first electrode wire 13a) was 1.2 mm.

W2 (a wire width of the lead wire 23c) was 1.4 mm.

In the X direction, it was assumed that the first electrode wire 13a overlapped the lead wire 23c as a whole in plan view. In addition, each of Example and Comparative Example, an interval between the first electrode wire 13a and the lead wire 23c was set to 60 µm.

Then, in a configuration of each of Example and Comparative Example, in an environment where a temperature was 60° C. and a humidity was 93%, each of Example and Comparative Example was held for a long time in a state in which +5 V was applied to the terminal electrode 13c and 0 V was applied to the terminal electrode 23e, and temporal change of electric characteristics was monitored.

Figure 6A:
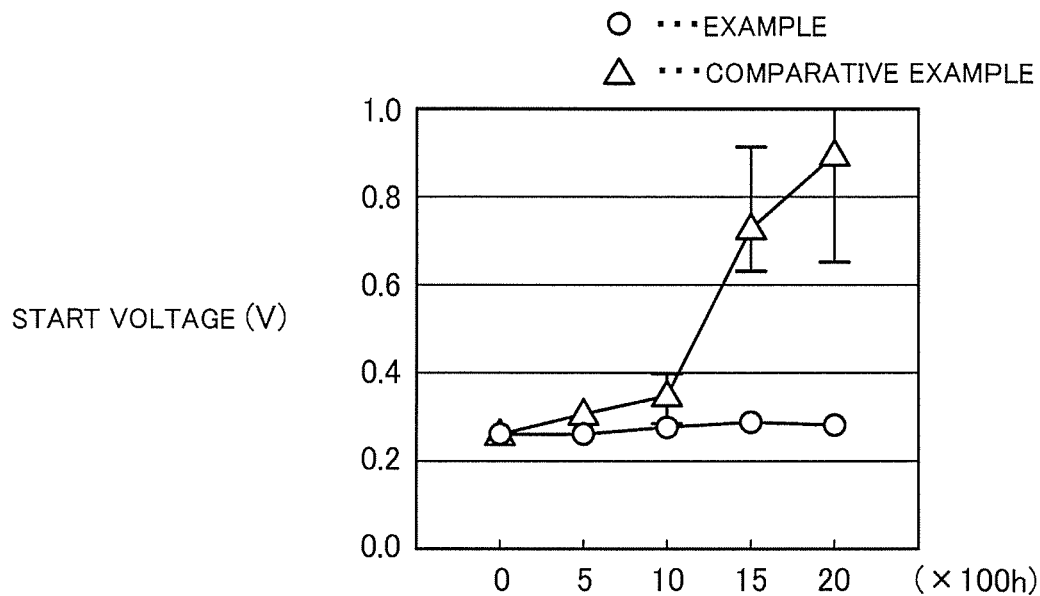
FIGS. 6A and 6B show graphs showing temporal changes in electric characteristics in Example and Comparative Example.
Figure 6B:
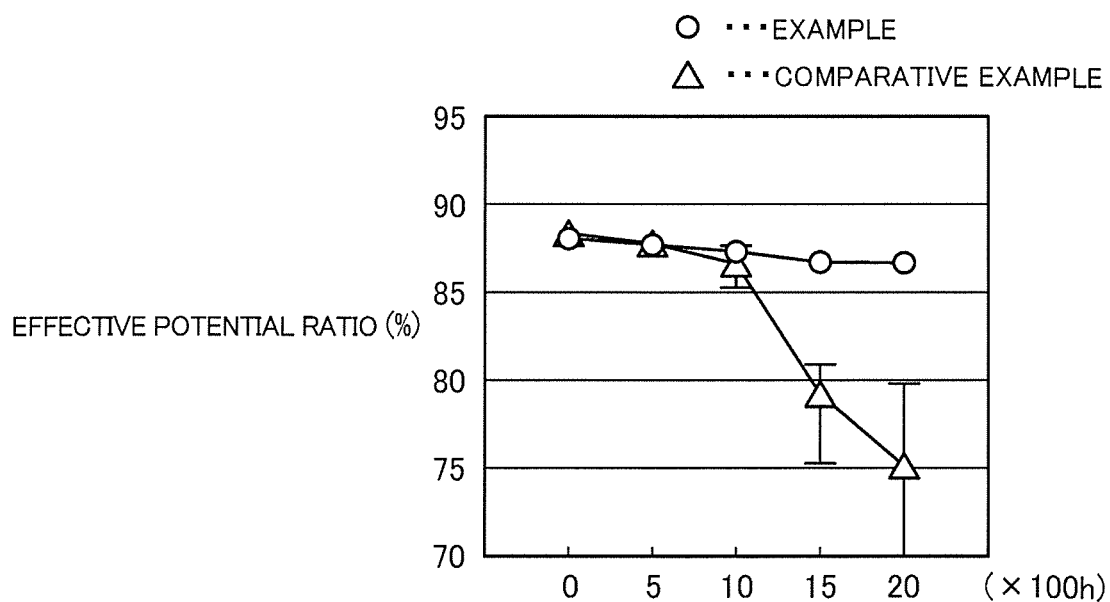

FIGS. 6A and 6B were a graph showing the temporal change of the electric characteristics in each of Example and Comparative Example. In FIGS. 6A and 6B, FIG. 6A is a start voltage, and FIG. 6B is an effective potential ratio. The start voltage is, as described above, the voltage at the end portion on the low potential side in the X direction of the operation area. In addition, the effective potential ratio is a ratio of a potential difference in the operation area to a voltage applied between the parallel electrodes, and is shown as follows:

Effective potential ratio (%)=(end voltage−start voltage)/applied voltage×100.

The end voltage is, as described above, the voltage at the end portion on the high potential side in the X direction of the operation area. When the effective potential ratio decreases, the voltage applied to the operation area decreases, and the accuracy of detecting the pressing position decreases.

As can be seen from FIGS. 6A and 6B, in Comparative Example, the electric characteristics were deteriorated over time, and when the elapsed time exceeded 1500 hours, the start voltage greatly increased and the effective potential ratio greatly decreased. This deterioration in the electric characteristics may be caused by the below-described mechanism. Specifically, 1) in the high-temperature and high-humidity environment, due to moisture absorption of the upper substrate (film), a part of the conductive particles constituting the electrode (first electrode wire 13a) are ionized, 2) by applying the voltage, the electric field is generated between the electrodes (between the first electrode wire 13a and the lead wire 23c), 3) due to the generated electric field, the ionized conductive particles of the electrode are moved to a side of the lower substrate and cause imbalance, and 4) due to this, the number of the conductive particles contacting the upper conductive layer decreases, thereby increasing a value of connection resistance between the upper conductive layer and the electrode. Such mechanism might cause deterioration of the electric characteristics.

In contrast, as can be seen from FIGS. 6A and 6B, in Example, the electric characteristics were not deteriorated over time, and even when the elapsed time exceeded 1500 hours, a large increase in the start voltage was not recognized, and the effective potential ratio was not lowered. Accordingly, the problem of decrease of the voltage applied to the operation area and accuracy of detecting the pressing position in the conventional touch panel is solved.

As described above, according to the present embodiment, in the X direction, the center line CL1 of the overlapping range E1 in which the first electrode wire 13a of the upper electrode portion 13 and the lead wire 23c of the lower electrode portion 23 overlap each other is shifted with respect to the center line CL of the first electrode wire 13a. Therefore, when the voltage is applied between the upper electrode portion 13 and the lower electrode portion 23, an intensity of the electric field generated between the first electrode wire 13a and the lead wire 23c can be partially made small. Thus, even when the DC voltage is applied between the upper electrode portion 13 and the lower electrode portion 23 for a long time under a high-temperature and high-humidity atmosphere, the connection resistance value between the upper conductive layer 12 and the first electrode wire 13a can be regulated. This can suppress deterioration of accuracy of detecting the pressing position on the touch panel.

In addition, according to the experiment conducted by the present inventors, it was confirmed that when the dimension of the overlapping range E1 in the X direction was two thirds or less of the dimension of the first electrode wire 13a, even in the case where the DC voltage was applied between the upper electrode portion 13 and the lower electrode portion 23 for a long time under the high-temperature and high-humidity atmosphere, deterioration of electric characteristics can be suppressed. Furthermore, it was confirmed that, in the X direction, when the dimension of the first electrode wire 13a excluding the overlapping range E1 was 0.4 mm or more, even in the case where the DC voltage was applied between the upper electrode portion 13 and the lower electrode portion 23 for a long time under the high temperature and high humidity atmosphere, deterioration of the electric characteristics can be suppressed. Moreover, although in the above-described Example and Comparative Example, the interval between the first electrode wire 13a and the lead wire 23c was set to 60 it was confirmed that the advantage of the present embodiment was obtained in a configuration in which the interval between the first electrode wire 13a and the lead wire 23c was 20 µm or more and 200 µm or less.

Figure 7:
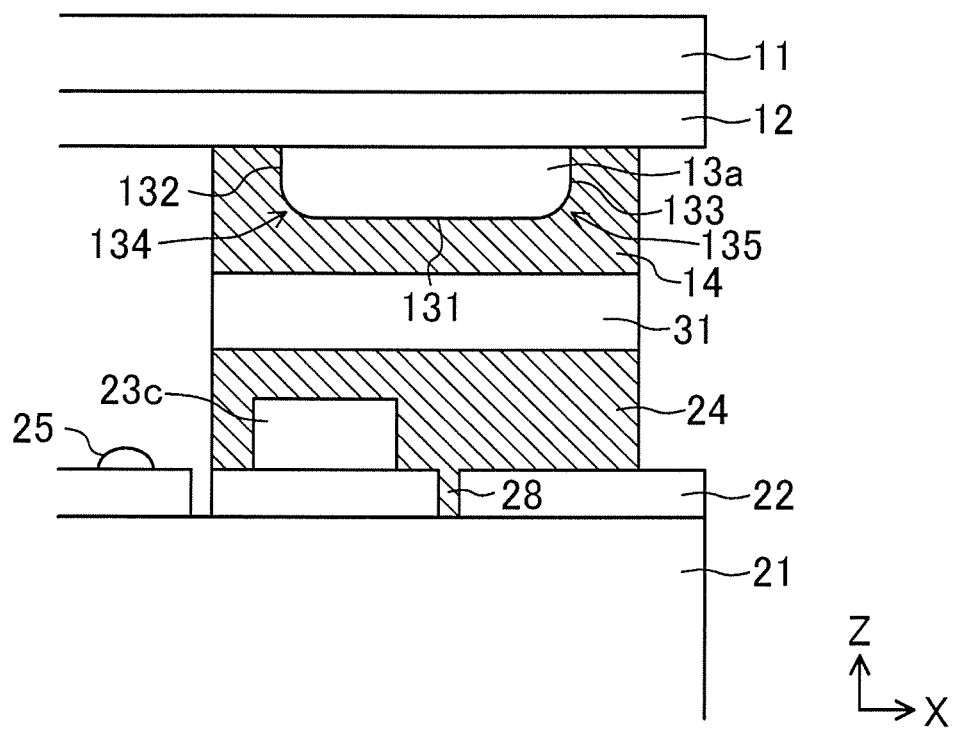
FIG. 7 is a diagram showing a configuration of a modified example and is an enlarged view of a portion shown in FIG. 1.

FIG. 7 is a diagram showing a configuration of a modified example, which corresponds to the enlarged view of the portion A in the sectional view of FIG. 1. In the configuration shown in FIG. 7, a shape of a first electrode wire 13a is slightly different from the shape of the first electrode wire 13a in the configuration shown in FIG. 5. Specifically, in FIG. 7, the first electrode wire 13a has a chamfered shape in corner portions 134 and 135 where a lower surface (surface facing a lead wire 23c) 131 and side surfaces 132 and 133 intersect each other. In other words, shapes of corner portions extending in the Y direction on a lower side of the first electrode wire 13a are rounded. Thus, since partial concentration of an electric field from the first electrode wire 13a toward the lead wire 23c can be avoided further than that in the configuration shown in FIG. 5, the deterioration in the electric characteristics of the touch panel 1 over time can be further suppressed.

Second Embodiment

Figure 8:
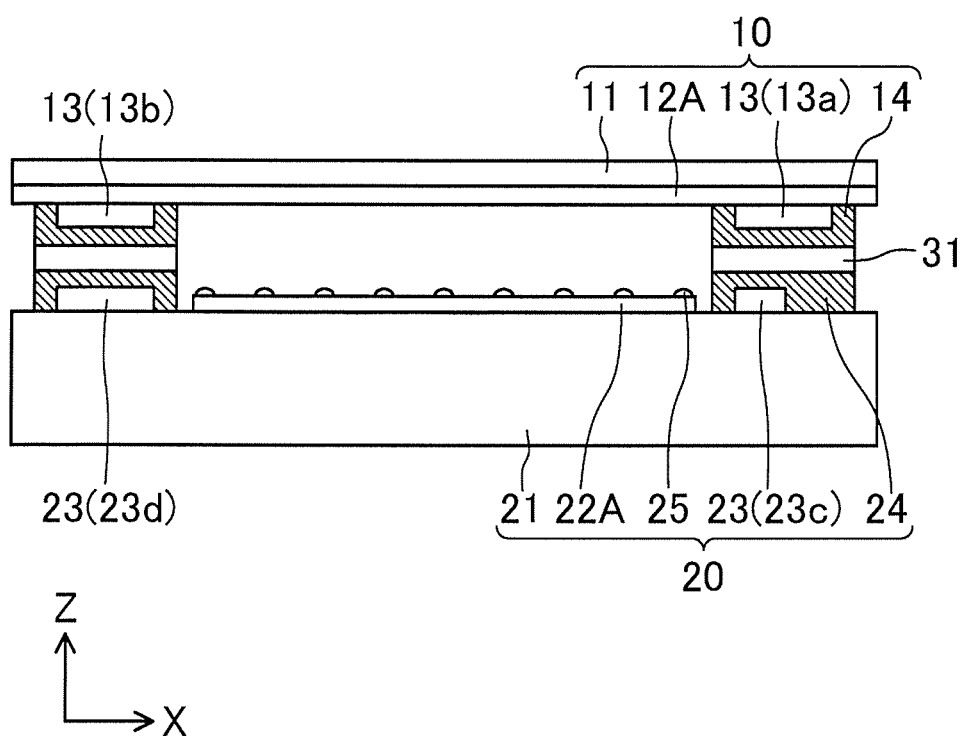
FIG. 8 is a cross-sectional view of a touch panel according to a second embodiment.
Figure 9:
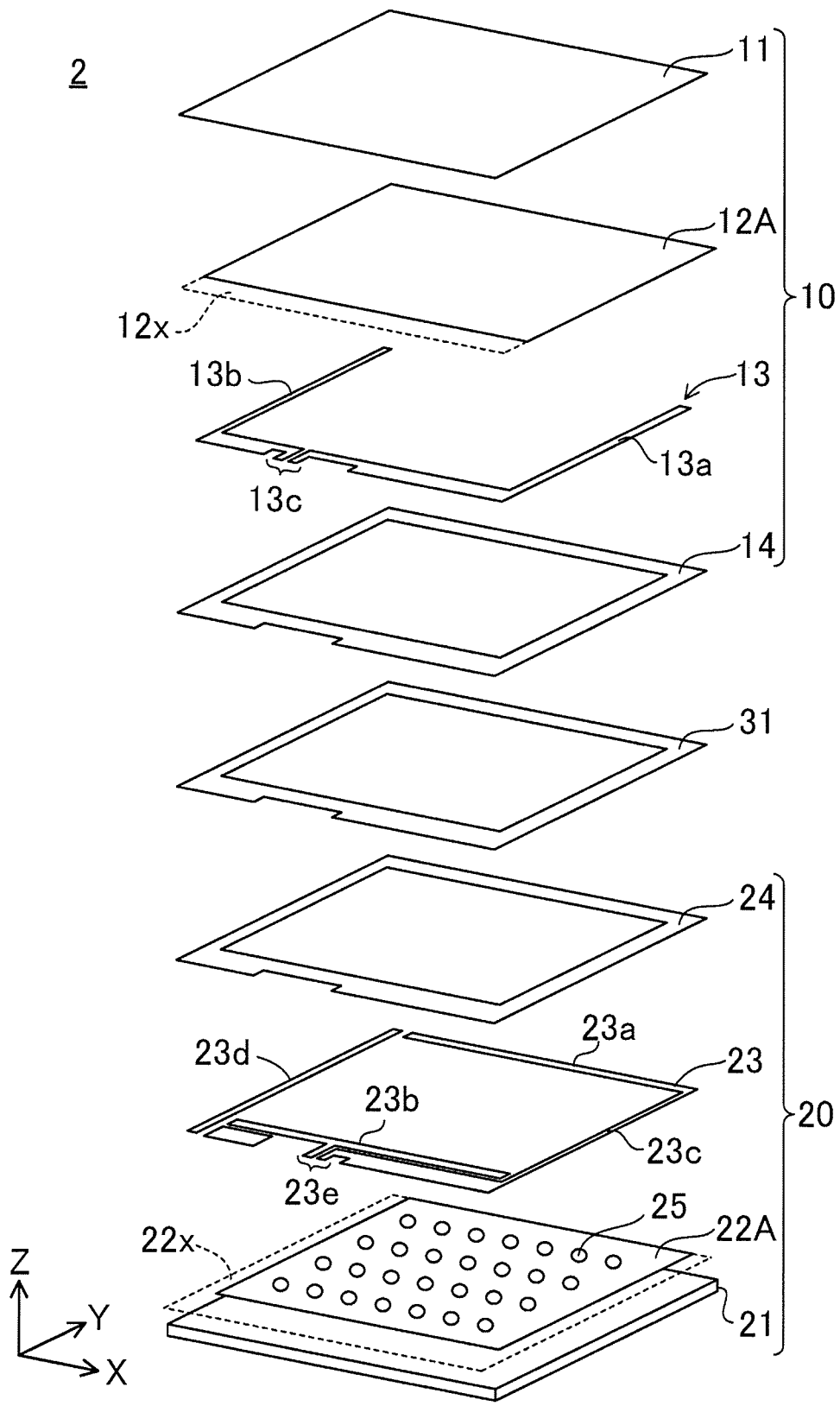
FIG. 9 is an exploded perspective view of the touch panel according to the second embodiment.

FIG. 8 is a sectional view of a touch panel according to a second embodiment, and FIG. 9 is an exploded perspective view of the touch panel according to the second embodiment. A configuration of the touch panel 2 shown in FIGS. 8 and 9 is substantially the same as that of the touch panel 1 described in the first embodiment. However, although in the first embodiment, a laser etching method is used as a manufacturing method, in the present embodiment, a wet etching method is used.

In the case of the wet etching, conductive layers are removed except for a conductive layer in an operation area and an area up to parallel electrodes which are electrically connected to the conductive layer in the operation area. Specifically, in an upper conductive layer 12A, a portion 12x overlapping a terminal electrode 13c of an upper electrode portion 13 is removed. In addition, in a lower conductive layer 22A, a portion 22x overlapping a lead wire 23c, a dummy wire 23d, and a terminal electrode 23e of a lower electrode portion 23 is removed. Therefore, the lead wire 23c and the dummy wire 23d are formed on a lower substrate 21 which is an insulator. Since the other structures are the same as those in the first embodiment, detailed description thereof will be omitted.

Also in the second embodiment, the same effect as that of the first embodiment can be obtained. In other words, in an X direction, a center line CL1 of an overlapping range E1 in which the first electrode wire 13a of the upper electrode portion 13 and the lead wire 23c of the lower electrode portion 23 overlap each other is shifted with respect to a center line CL of the first electrode wire 13a. Therefore, when the voltage is applied between the upper electrode portion 13 and the lower electrode portion 23, an intensity of the electric field generated between the first electrode wire 13a and the lead wire 23c can be partially made small. Thus, even when a DC voltage is applied between the upper electrode portion 13 and the lower electrode portion 23 for a long time in a high-temperature and high-humidity atmosphere, a value of connection resistance between the upper conductive layer 12A and the first electrode wire 13a can be regulated. This can suppress deterioration of accuracy of detecting a pressing position.

Other Embodiments

Although in the embodiments described above, the position of the lead wire 23c is shifted toward the operation area TA with respect to the first electrode wire 13a, the lead wire 23c may be shifted to be away from the operation area TA with respect to the first electrode wire 13a. Even in this configuration, when a voltage is applied between the upper electrode portion 13 and the lower electrode portion 23, an intensity of an electric field intensity generated between the first electrode wire 13a and the lead wire 23c can be partially made small, and the same advantageous effect as that of the above-described embodiments can be obtained. However, the configuration in which the lead wire 23c is shifted toward the operation area TA with respect to the first electrode wire 13a as shown in the above-described embodiments is preferable in that the occurrence of Newton's rings, which is attributable to a decrease in an gap amount between the upper wiring board 10 and the lower wiring board 20, can be suppressed.

The material of the upper substrate 11 may be, for example, polycarbonate resin or the like as a material having light transmittivity other than the polyethylene terephthalate resin and furthermore, front and rear surfaces thereof may be coated with hard coat layers, each of which is coated with a thin film of a material having a slightly high hardness for preventing scratches, or may be coated with anti-Newton's rings layers, each of which has fine irregularities for enhancing visibility, or the like.

In addition, each of the upper conductive layer 12 and the lower conductive layer 22 may be a conductive layer using tin oxide, zinc oxide, or gold, silver, copper, a conductive polymer, or the like, or a conductive layer using a combination thereof.

In addition, although in the above description, the silver is used as an example of the conductive metal contained in the upper electrode portion 13 and the lower electrode portion 23, the conductive metal may be, for example, gold, copper, nickel, or a mixture thereof other than the silver. Note that when the silver is selected, silver paste which is relatively easily available can be used, thereby simplifying manufacturing.

Furthermore, when the adhesive layer 31 having high insulating properties is used, no insulating layers 14 and 24 may be provided, and the materials of the insulating layers 14 and 24 and the adhesive layer 31 are not limited to those described above.

In view of the foregoing description, the embodiments of the present disclosure are described. However, the present disclosure is not limited to the above-described embodiments alone, and various modifications may be made within the scope of the present disclosure.

What is claimed is:

1. A touch panel comprising:
an upper wiring board having an upper substrate, an upper conductive layer formed on the upper substrate, and an upper electrode wire electrically connected to the upper conductive layer; and
a lower wiring board having a lower substrate, a lower conductive layer formed on a surface of the lower substrate, the surface being closer to the upper wiring board, a lower electrode wire electrically connected to the lower conductive layer, and a lead wire electrically connected to the lower conductive layer, wherein
the lead wire is thinner than the upper electrode wire and overlaps the upper electrode wire in plane view,
a center line of an overlapping range in which the upper electrode wire and the lead wire overlap each other is located closer to an operation area than a center line of the upper electrode wire,
a first portion of the lower conductive layer below the lead wire is electrically disconnected from a second portion of the lower conductive layer, and
the second portion is located on the opposite side of the operation area with respect to the first portion.

2. The touch panel of claim 1, wherein an end portion, of the lead wire, near the operation area is located closer to the operation area than an end portion, of the upper electrode wire, near the operation area is.

3. The touch panel of claim 1, wherein the lead wire is in contact with the lower substrate.

4. The touch panel of claim 1, wherein corner portions of the upper electrode wire are rounded.

5. The touch panel of claim 1, wherein the upper electrode wire, the lower electrode wire, and the lead wire contain silver.

6. The touch panel of claim 1, wherein the first portion of the lower conductive layer is electrically disconnected from the second portion of the lower conductive layer by a groove formed in the lower conductive layer.

* * * * *